United States Patent
Kling et al.

(10) Patent No.: US 8,260,886 B2
(45) Date of Patent: Sep. 4, 2012

(54) COMPILING METHOD FOR COMMAND BASED ROUTER CLASSIFIERS

(75) Inventors: Lars-Örjan Kling, Södertälje (SE); Robert E Penny, Huddinge (SE); Yonghui Jin, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1019 days.

(21) Appl. No.: 12/158,791

(22) PCT Filed: Dec. 30, 2005

(86) PCT No.: PCT/SE2005/002071
§ 371 (c)(1), (2), (4) Date: Sep. 16, 2008

(87) PCT Pub. No.: WO2007/078220
PCT Pub. Date: Jul. 12, 2007

(65) Prior Publication Data
US 2009/0199266 A1    Aug. 6, 2009

(51) Int. Cl.
G06F 15/177    (2006.01)
G06F 15/173    (2006.01)
(52) U.S. Cl. .................. 709/220; 709/221; 709/238
(58) Field of Classification Search .............. 709/238
See application file for complete search history.

(56) References Cited

U.S. PATENT DOCUMENTS

| | | | |
|---|---|---|---|
| 6,917,946 B2* | 7/2005 | Corl et al. | 707/737 |
| 7,698,125 B2* | 4/2010 | Graehl et al. | 704/5 |
| 2004/0170172 A1* | 9/2004 | Pullela et al. | 370/392 |
| 2011/0213738 A1* | 9/2011 | Sen et al. | 706/12 |

* cited by examiner

*Primary Examiner* — Michael Y Won
*Assistant Examiner* — Tom Y Chang

(57) ABSTRACT

A method and compiler for compiling hierarchical command based policy rules to a flat filter list structure adapted for storage in a Content Addressable Memory (CAM), wherein the policy rules are organized in a tree-structure of classifiers. First, all of the possible search paths in the tree structure are found, and then only the valid search paths according to defined criteria are added to the flat filter list. The CAM may be a Ternary Content Addressed Memory.

7 Claims, 5 Drawing Sheets

Filter rule represented as a TCAM entry    Associated Value

| Src ip addr | Dst ip addr | Protocol | Src port | Dst port | Permit |
|---|---|---|---|---|---|
| xxxxxxxxx | xxxxxxxxx | 0100 | xxxxxx | xxxxxx | 01 |

Example: a filter with multiple fields – 5 tuples

| Src ip addr | Dst ip addr | Protocol | Src port | Dst port |
|---|---|---|---|---|

Respresented in binary CAM

| 1111000100010001 | 0001000100 | 010001 | 0001 | 00010010 | 01001010 |
|---|---|---|---|---|---|

Respresented in ternary CAM

| 11101000000010XX | 10001000100010XX | 1XXX | 100100XX | 0101XXXX |
|---|---|---|---|---|

Fig. 4

COMPILING METHOD FOR COMMAND BASED ROUTER CLASSIFIERS

TECHNICAL FIELD

The present invention relates to IP classification in routers.

The present invention relates to a method for compiling command based router classifiers to an equivalent flat structure that is suitable for storing in Ternary CAM (Content Addressable Memory) for fast look-up.

BACKGROUND OF THE INVENTION

Internet Protocol (IP) classification is performed in routers. This is the process of classifying IP packets into categories that require special treatment. A subset of IP classification is IP filtering. IP filtering is a security feature that restricts IP traffic by permitting or denying packets by applying certain rules. This way, users can be restricted to specific domains or applications on the Internet. To perform classification, IP headers of packets that reach a router need to be compared to patterns stored in a table, generating an output that classifies the packet. Usually, this table is stored in memory and matching is done in software.

The functionality of filtering and classifying packets treated here is called Multi-field (MF) classification, since it acts on several independent fields in the packet headers, and is used both for Differentiated Services (DiffServ) policy enforcement and security (firewall) filtering.

The IP header fields on which packets can be classified by the filters are:

IP Source Address;
IP destination Address;
IP version—IPv4 or IPv6 or both;
Protocol—next header protocol (layer 4);
DSCP—DS code point (former TOS field);
Source Port—with limited range possibility;
ICMP Type;
TCP Session Established.

The command based router classifiers is structured in a tree-like hierarchy with a policy map consisting of class maps, access control lists and filters with their match outcomes, actions and match patterns.

Said structures are built in a hierarchy of the components Filters, ACLs (access control lists, or just access lists), CMAPs (class maps) and PMAPs (policy maps). These components will now be described one by one in more detail with reference to FIG. 1:

Filter—this component cannot be specified alone, but only as part of an including ACL. Each filter consists of a match field and a result. The match field is a bit-pattern, wherein "don't care" is allowed, to test for match against defined header fields of packets to be classified. The result is an indication of whether or not a packet matching the match field is considered to belong to the ACL as a whole. Conventionally the result is called either "permit", meaning "belongs to ACL", or "deny", meaning "does not belong to ACL". (These conventional terms come from the original restricted use of ACLs, which was only to determine access through a firewall.) For the extended use of ACLs employed now, it is suggested using "+" and "−" instead of permit and deny.

ACL—Access Control List, or just access list, is an ordered list of Filters to be tried for match against packets to be classified, starting at the head of the list, and progressing through until some filter matches, or until the end of the list is reached. If the end of the list is reached without any filter matching, it is deemed that the packet does not match the ACL, which could be considered as an implicit filter at the tail of the ACL having bits "don't care" in the match field and "deny" as the result. Each ACL is defined by a management operation and is given a name to use as reference. Filters can be added and removed from existing ACLs. Note that the order of the filters in an ACL is significant, so the position, priority, of added filters can be specified. ACLs can be used in two ways: as a member of a CMAP (see below) or tied directly to an interface as a firewall filter.

CMAP—Class Map is a set (order not significant) of specified (by name, e.g. reference number) ACLs and match operator, also denoted match mode, which is either match-any or match-all. A packet being classified is considered to belong to a class defined by a CMAP either if it matches any of the ACLs in a CMAP having the match-any attribute or, if, and only if, it matches all the ACLs in a CMAP having the match-all attribute. CMAPs are defined by management operations and given a reference name. Existing CMAPs can also be modified. The only use of a CMAP is by membership in a PMAP.

PMAP—Policy Map is an ordered set of CMAPs to which each CMAP is associated with an action. A PMAP can be tied to an interface, and then all packets passing the interface will be tested against the PMAP, starting with the first CMAP and continuing until the packet is found to belong to a CMAP or until all CMAPs have been exhausted. When the packet is found to belong to a CMAP, the associated action is performed. The possible actions are:

FORWARD—which means "forward the packet";
DROP—drop the packet;
REMARK DSCP n—rewrite the DSCP (DS code point) field of the packet to a specified new value.
The default action is FORWARD.

Note: When a packet matches a filter having result permit, thus causing the packet to belong to the class defined by a CMAP including this ACL, and in which the CMAP is included in a PMAP with action DROP. The packet is thus dropped due to matching a filter with permit.

Each interface can be tied to at most one PMAP and one firewall ACL (otherwise would not make sense). Inbound and outbound interfaces are treated separately.

Since ACLs are referred to by name, the same ACL can be used in several roles (as member of multiple CMAPs and/or as firewall ACL for various interfaces). Likewise, the same CMAP can be used in multiple PMAPs, and the same PMAP can be tied to various interfaces.

If an interface is tied both to a firewall ACL and to a PMAP, the firewall ACL ($ACL_{FW}$) is traversed first, and only if a packet is permitted for access is it tested against the PMAP. Interfaces which is not connected to a firewall ACL are implicitly permitted for access.

Due to increasing performance requirements and larger and wider search sets, software-based search algorithms become too slow and alternative implementations need to be considered. One such alternative is to use a Content Addressable Memory (CAM).

A Content Addressable Memory, CAM, is a memory device that has become increasingly valuable during the recent years in some applications. A CAM can perform fast storing and search operations. The CAM provides a performance advantage over memory search algorithms such as binary and tree based searches or look-aside tag buffers by comparing the desired information against the entire list of pre-stored data simultaneously often resulting in an order-of-magnitude reduction of search time. Once information is stored in a CAM location, it is found by comparing every bit in the CAM with the bits of the data in a search expression. If there is a match for every bit in a location with every corresponding bit in the search expression, an output is obtained from the CAM, which is an association value or address pointing to associated information. The associated information may be stored in a conventional memory device such as a RAM. Depending on the application, the RAM can contain information or instructions or operations or the like to be displayed or performed when there is a match between the search expression and the information stored in the CAM. Thus, with a CAM, the data is supplied and the address is obtained.

Because the CAM doesn't need address lines to find data, the depth of a memory system using CAMs can be extended as far as desired, but the width is limited by the size of the chip. For example, a chip can be 64 to 128 bits wide, but 32768 entries deep. It is fairly easy to extend the depth of the CAM, because the addressing is all self-contained.

Some CAMs are so called ternary CAMs in which the stored data can contain bit values of 0, 1 or X, where X is interpreted as "don't care", i.e. the value matches both 0 and 1.

The function and advantages of the CAM memory makes it very suitable for applications and operations such as LANs, data base management, file storage management, look-up to pattern recognition, and the like, and is particularly suited to performing search operations. To classify a packet, the look-up performance will depend on the search algorithm, and the look-up time is not deterministic using software solutions. Hardware accelerated solutions, such as Ternary Content Addressable Memory (TCAM), will increase the search performance by orders-of-magnitude as the look-up in TCAM entries can be performed with a single operation, typically at one clock cycle. In recent years, TCAMs are becoming faster, bigger and cheaper, and they provide an excellent solution for doing very fast look-ups with deterministic look-up time.

A method in which CAMs of less width are used to store "expressions" in CAMs and to match expressions with the contents of CAMs, where the width of the expressions is larger than the width of the CAMs used, is earlier known from the international patent application WO 02/082458.

From the U.S. Pat. No. 6,484,170 techniques for generating searchable data entries in a CAM, such as binary or ternary CAMs, are earlier known. In said document, a method of classifying data networking packets and a packet classifier based on subfields of a packet header are also described.

Packet classification by using TCAMs is earlier known and treated in a document "Efficient Mapping of Range Classifier into Ternary-CAM" by Huan Liu, published on the internet by Department of Electrical Engineering, Stanford University, CA 94305.

In practice, complications arise because the desired classification rules to be enforced on the traffic flow, as defined by a network manager, consist of a tree-like structure in which it is required to look for more than one possible match against each packet in the flow. Such a structure is straightforward and easy to follow manually, or by a procedural program, but not by a linear CAM array which terminates search at the first matching entry. However, CAMs, such as TCAMs, can only store flat structures and a tree-like hierarchy cannot be stored in it directly. To get a table of CAM entries to provide a behaviour corresponding to that of the tree-like structure, the filter rules must be "flattened" to a linear array, taking advantage of the CAM's ternary capability ("don't care" match at required bit positions). The implementation of the "flattening" of the filter tree is called the "Filter Compiler". Therefore, an algorithm is needed for compiling the command based router classifiers with a tree-like hierarchy to an equivalent flat CAM friendly structure.

BRIEF DESCRIPTION OF THE INVENTION

One of the objects with the present invention is to provide an algorithm for compiling the command based router classifiers with a tree-like hierarchy to an equivalent flat CAM friendly structure.

Therefore, the present invention solves the problem to compile command based policy rules to a format, such as a flat filter list structure, adapted for storage in a Ternary Content Addressable Memory (TCAM), by a method that involves steps of finding all the possible search paths in the tree structure and steps of only adding the valid search paths according to defined criteria to the flat filter list.

An advantage with the present invention is that it provides a computerized method to compile the command based router classifiers with a tree-like hierarchy to an equivalent flat CAM friendly structure. This will save a lot of time and money as the work to transform filter rules from tree-structure to flat structure does not have to be performed manually. This is especially interesting when converting old filter rule systems to TCAM solutions.

BRIEF DESCRIPTION OF THE DRAWINGS

The present invention will now be described in more detail with reference to following drawings:

FIG. 4 is an illustration of a filter rule represented as TCAM entry.

DETAILED DESCRIPTION OF THE INVENTION

The functionality of filtering and classifying packets treated here is called Multi-field (MF) classification, since it acts on several independent fields in the packet headers, and is used both for Differentiated Services (DiffServ) policy enforcement and security (firewall) filtering.

Figure 1:
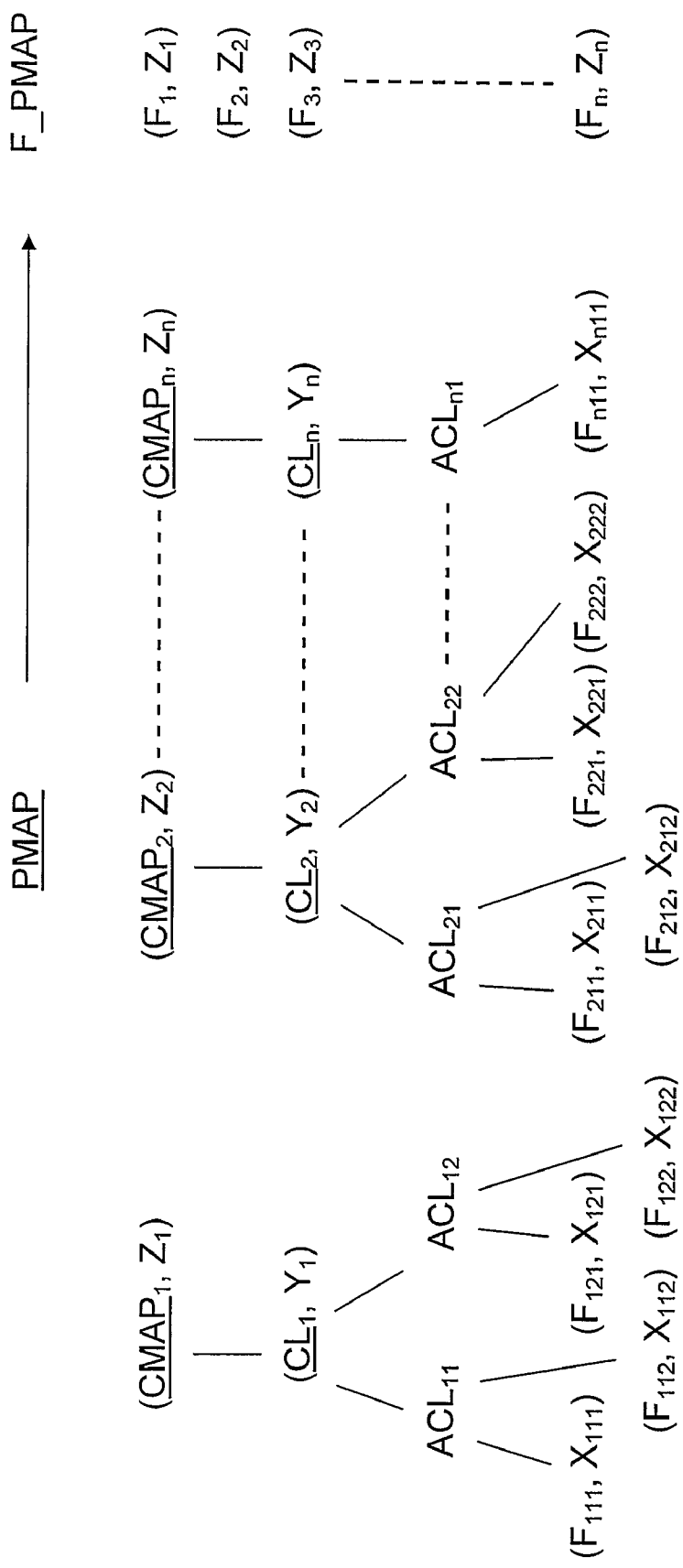
FIG. 1 is a diagram schematically showing a tree-like filter structure and a flat filter structure.
Figure 2:
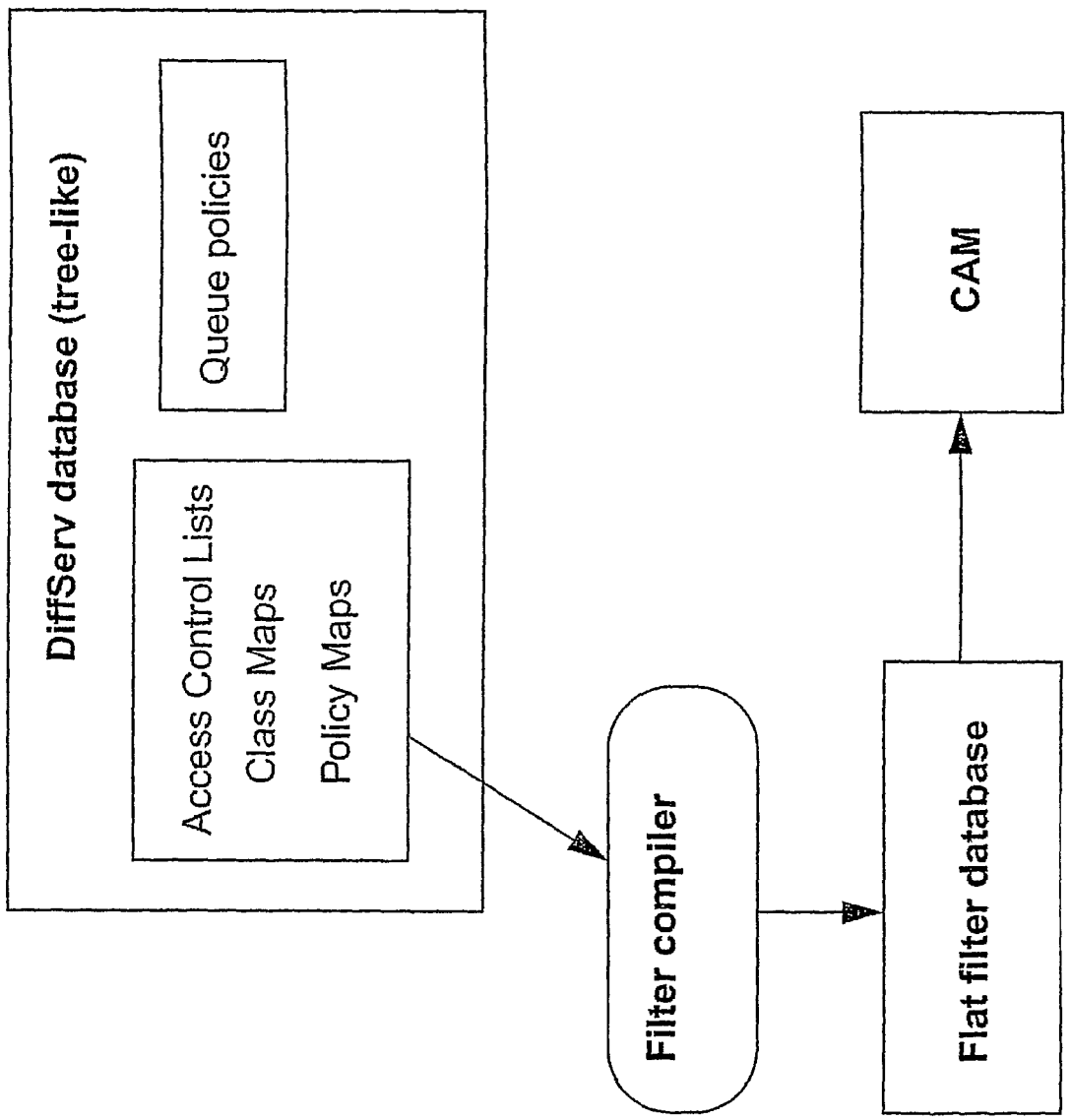
FIG. 2 is a block diagram illustrating an application of the present invention.

FIG. 2 is a block diagram illustrating an application of the present invention. The present invention is illustrated as a filter compiler that is used to transform a database of classifiers in a Differentiated Services (DiffServ) application. When defining a policy for IP traffic in DiffServ, filter are used. Said filter, or rather filter rules, is organized in a tree-like structure of classifiers such as Access control lists, Class Maps and Policy Maps. To speed up the seeking process for filter match, a Content Addressable Memory (CAM) can be used to store the filter entries. As CAM has a flat structure and it searches all the entries at the same time, it is not suitable to store a tree-like structure in a CAM. Thus it is necessary to have a filter compiler to transform the tree-like filter structure to a flat database.

Figure 3:
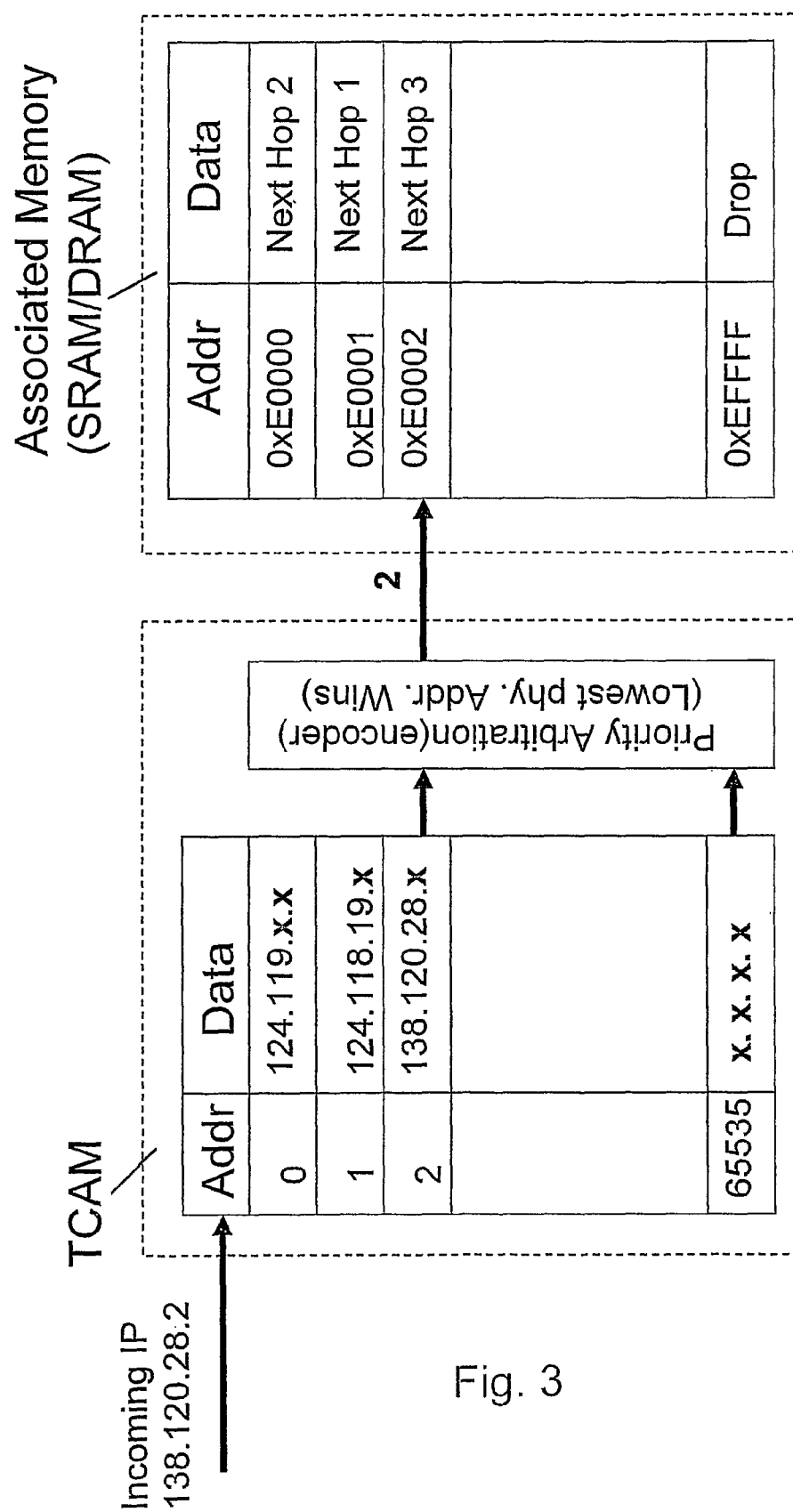
FIG. 3 is a block diagram illustrating TCAM application for IP address look-up.

FIG. 3 is a block diagram illustrating TCAM application for IP address look-up.

The use of TCAM memory for classification is straightforward. Each entry in the TCAM consists of a vector of three-valued bits corresponding to certain fields in the header of an IP packet, therefore the name "ternary CAM" can be used. The value of each three-valued bit position can be 0, 1, or x, where x means "don't care". A search in the CAM is performed by the hardware HW against a packet by applying the header fields of the packet (a vector of only 0's and 1's) to the CAM's internal logic. The CAM then, using fast parallel logic, finds the first "matching" entry (priority arbitration) and outputs its address (reference number 2 in the figure). This address is then used to access a normal associated SRAM memory, from which a pre-stored output is fetched "Next Hop 3", which affects the further handling of the packet.

The combination of the match pattern in the CAM and the output value in the associated SRAM address is referred to as a "CAM entry".

Thus setting up filtering and classification in the hardware consists of inserting into certain CAM positions a pattern which will match a sought-after packet, and writing the corresponding output-SRAM position an instruction to the HW guiding treatment of the packet. To achieve "wire speed" processing of IP packets arriving on high-speed links. The actual treatment of individual IP packets is therefore performed in hardware. Software is used to configure and control the hardware so that it can do its job efficiently, and correctly according to the intentions of the network manager, which through e.g. a command line interface to a router can apply various filtering and packet-treatment policies.

FIG. 4 is an illustration of an example of a filter rule represented as TCAM entry. A filter rule is an ordered pair (F,X) where F is filter and X is the match outcome, e.g. action taken when the filter matches an incoming packet. The filter consists of one or more bit fields—in this case 5 tuples—each field corresponding to a header field an incoming packet, and an associated value. The difference in filter representation between a binary CAM and ternary CAM is also illustrated. The TCAM is able to use the "don't care" value (x or *) in the bit positions. The IP header fields on which packets can be classified by the filters are:

IP Source Address (don't care field allowed in least significant bits);

IP destination Address (don't care field allowed in least significant bits);

IP version—IPv4 or IPv6 or both (both allowed only if source and destination addresses are completely don't care);

Protocol—next header protocol (layer 4);

DSCP—DS code point (former TOS field);

Source Port—with limited range possibility;

ICMP Type;

TCP Session Established (based on RST and ACK bits in TCP header).

The present invention is a method for transforming tree-like organized classifiers to "flat filter" structure. The invention is implemented in computer software programming for computers and data processing. The different steps of the invention is possible to code into computer software instructions in different computer program languages and coding. As mathematical theory often is very useful for describing methods and for guiding computer software programming, the invented method will be described hereafter by using the theory of sets.

First some basic terms has to be defined in accordance to the theory of sets.

Sequences, n-tuples and ordered pairs.

A sequence is an ordered set of elements, $$S = (s_1, s_2, \ldots, s_n) = \left(\sum_{i=1}^{n} <s_i>\right),$$

where < > is used here to give the sum operator, $\Sigma$, another meaning, i.e. inserting/adding a new element at position i. Similarly, we use the operator "+" also with a new meaning, so that $$\left(\sum_{i=1}^{m} <s_{1,i}>\right) + \left(\sum_{j=1}^{n} <s_{2,j}>\right) = (s_{1,1}, s_{1,2}, \ldots, s_{1,m}, s_{2,1}, s_{2,2}, \ldots, s_{2,n})$$
$$= (s_1, s_2, \ldots, s_{m+n})$$
$$= \left(\sum_{i=1}^{m+n} <s_i>\right)$$

Notice that a sequence differs from a set in that the order of the element in a sequence is of importance (and duplicated elements are not redundant), while in a set, $$A = \{a_1, a_2, \ldots, a_n\} = \sum_{i=1}^{n} \{a_i\},$$

the order is of no importance, and duplicated elements are redundant and thus can be removed.

A sequence with n elements is also called an n-tuple. A 2-tuple is also called an ordered pair, $S=(s_1, s_2)$.

Operations such as union and intersection can be applied to two sequences, $X_1$ and $Y_2$, with the same size, n elements:

$$X_1 \cup Y_1 = (x_1, x_2, \ldots, x_n) \cup (y_1, y_2, \ldots, y_n)$$
$$= \left(\sum_{i=1}^{n} <x_i>\right) \cup \left(\sum_{i=1}^{n} <y_i>\right)$$
$$= (x_1 \cup y_1, x_2 \cup y_2, \ldots, x_n \cup y_n)$$
$$= \left(\sum_{i=1}^{n} <x_i \cup y_i>\right)$$

and $$X_1 \cap Y_1 = (x_1, x_2, \ldots, x_n) \cap (y_1, y_2, \ldots, y_n)$$
$$= \left(\sum_{i=1}^{n} <x_i>\right) \cap \left(\sum_{i=1}^{n} <y_i>\right)$$
$$= (x_1 \cap y_1, x_2 \cap y_2, \ldots, x_n \cap y_n)$$
$$= \left(\sum_{i=1}^{n} <x_i \cap y_i>\right)$$

Packet and ternary packet filter.

A packet is a sequence with n elements (n-tuple), $P=(p_1, p_2, \ldots, p_n)$, where 1, 2, ..., n are the bit position in the packet; $p \in \{0,1\}$.

A ternary packet filter is a sequence with the same number of the elements as in a packet, $F=(f_1, f_2, \ldots, f_n)$, where 1, 2, ..., n matches the bit positions in a packet; f∈{0,1,*,Ø}, where * is the don't care bit (i.e. wildcard), and Ø is null (see FIG. 4).

If there exist one or more elements in F with value Ø, then F=$F_Ø$, which is called a null filter. No packet will match a null filter.

A packet matches a filter if $P \cap F \neq F_Ø$.

The intersection between two filters, $F_1$ and $F_2$.

$$F_1 \cap F_2 = (f_{F1,1}, f_{F1,2}, \ldots, f_{F1,n}) \cap (f_{F2,1}, f_{F2,2}, \ldots, f_{F2,n})$$
$$= (f_{F1,1} \cap f_{F2,1}, f_{F1,2} \cap f_{F2,2}, \ldots, f_{F1,n} \cap f_{F2,n})$$
$$= \sum_{i=1}^{n} <f_{F1,i} \cap f_{F2,i}>$$

where the operation $f_{F1,i} \cap f_{F2,i}$ (i∈{0, 1, ... n}) is defined in Table 1.

TABLE 1

| Intersection of two filter elements | | | | |
|---|---|---|---|---|
| $f_{F1,i} \cap f_{F2,i}$ | 0 | 1 | * | Ø |
| 0 | 0 | Ø | 0 | Ø |
| 1 | Ø | 1 | 1 | Ø |
| * | 0 | 1 | * | Ø |
| Ø | Ø | Ø | Ø | Ø |

If there exists at least one i(i∈{0, 1, ..., n}), $f_{F1,i} \cap f_{F2,i} = Ø$, then $F_1 \cap F_2 = F_Ø$.

The classifiers will now be described in terms of the mathematical theory.

A classifier can be represented by a Policy Map (PMAP), and the building blocks in a PMAP hierarchy at different levels are:

Filter and the corresponding match outcome (permit/deny)

Access Control List (ACL)

Class List (CL)

Class Map and its match pattern (match all/match any)

Access Control List (ACL)

An ACL is a sequence of ordered pairs (F, X), where F is a filter and X is the corresponding matching outcome, X∈{permit, deny}. We use the symbols $X_+$ for permit and $X_-$ for deny.

$$ACL = ((F_1, X_1), (F_2, X_2), \ldots, (F_n, X_n)) = \sum_{i=1}^{n} <(F_i, X_i)>$$

A packet matches an ACL if there exists at least one $F_i$ (i∈{0, 1, ..., n}) in the ACL, $P \cap F_i \neq F_Ø$, The matching outcome is the one for the matching filter with lowest index, i.e. for all $F_j$ where j<i, $P \cap F_j = F_Ø$, the match outcome will be $X_i$.

An ACL always ends with an implicit, if not already existing, universal filter ($F_*$) with a default match outcome (usually is the deny match outcome, $X_-$), so a packet always matches this one with the outcome ($X_-$) if no other matches encountered prior to this.

Class Map (CMAP) and Class List (CL)

A Class List (CL) is a sequence of ACLS, $$CL = (ACL_1, ACL_2, \ldots, ACL_n) = \sum_{i=1}^{n} <ACL_i>$$

And a CMAP is an ordered pair of Class List and a corresponding match operator (Y):

$$CMAP = (CL, Y) = ((ACL_1, ACL_2, \ldots, ACL_n), Y)$$
$$= \left( \left( \sum_{i=1}^{n} <ACL_i> \right), Y \right)$$

where the match operator Y∈{match all, match any}. We use the symbols $Y_{all}$ for match all operator and $Y_{any}$ for match any operator.

For match all operation, a packet matches a Class Map with $X_+$ (permit) if there exists at least one filter, which is the first matching filter in the ACL, with the match outcome $X_+$ (permit) in each of the ACLs of the Class List. In other words, the packet must match all ACLs in the CL of the CMAP with the match outcome $X_+$ (permit). If in any ACL, the first matching filter has an outcome $X_-$ (deny), the match has an outcome $X_-$ (deny) for the CMAP.

For match any operation, a packet matches a CMAP with $X_+$ (permit) if and only if it matches at least one filter, which is the first matching filter encountered, with the match outcome $X_+$ (permit) from at least one ACL in the CL of the CMAP. In other words, the packet can match any of ACLs in the CL of the CMAP with the match outcome $X_+$ (permit). If in any ACL, the first matching filter has outcome is $X_-$ (deny), the match has an outcome $X_-$ (deny) for the CMAP.

Notice that the order of ACLs in a CL is of no importance. So a CMAP can then be rewritten as:

$$CMAP = (\{ACL_1, ACL_2, \ldots, ACL_n\}, Y)$$
$$= \left( \left\{ \sum_{i=1}^{n} \{ACL_i >\} \right\}, Y \right)$$

If there exists only one ACL in the CL of a CMAP, the match all and match any are equivalent.

Note: In the presentation of the invention, it has been chosen that for match all operation or match any operation, a packet matches a Class Map with $X_+$ (permit). However, the invented algorithm is not limited to packet matches a Class Map with $X_+$ (permit), deny is applicable in some applications.

Policy Map (PMAP)

A policy map (PMAP) is a sequence of pairs (CMAP, Z) where Z is the action to be taken for the packet if it matches the CMAP with permit. The actions are typically Forward, Drop, Remark DSCP Field in the IP Header and so on.

$$PMAP = ((CMAP_1, Z_1), (CMAP_2, Z_2), \ldots, (CMAP_n, Z_n))$$
$$= \left( \sum_{i=1}^{n} <(CMAP_i, Z_i)> \right)$$

A packet matches a PMAP if and only if it first matches a $CMAP_i$, with the outcome $X_+$ (permit) and the corresponding action $Z_i$ will be performed for the packet. If a packet does not match any of the CMAPs or all the CMAPs match with outcome $X_-$ (deny), a default action $Z_{Def}$ is performed for the packet. So a PMAP is implicitly equivalent to:

$$PMAP = ((CMAP_1, Z_1), (CMAP_2, Z_2), \ldots, (CMAP_n, Z_n), (CMAP_*, Z_{def}))$$
$$= \left( \sum_{i=1}^{n} <(CMAP_i, Z_i)>, (CMAP_*, Z_{Def}) \right)$$

The universal CMAP, $CMAP_*$, contains only one ACL, the universal $ACL_*$, together with a universal match operator, $Y_*$:

$$CMAP_* = ((ACL_*), Y_*)$$

where $ACL_* = ((F_*, X_-))$ and $Y_*$ means the match operator can either be match all ($Y_{All}$), or match any ($Y_{Any}$).

In general, a PMAP can be expressed by:

$$PMAP = \left( \sum_{i=1}^{N} <(CMAP_i, Z_i)> \right)$$

where the last element is the implicit universal CMAP with default action, $(CMAP_*, Z_{Def})$.

Figure 5:
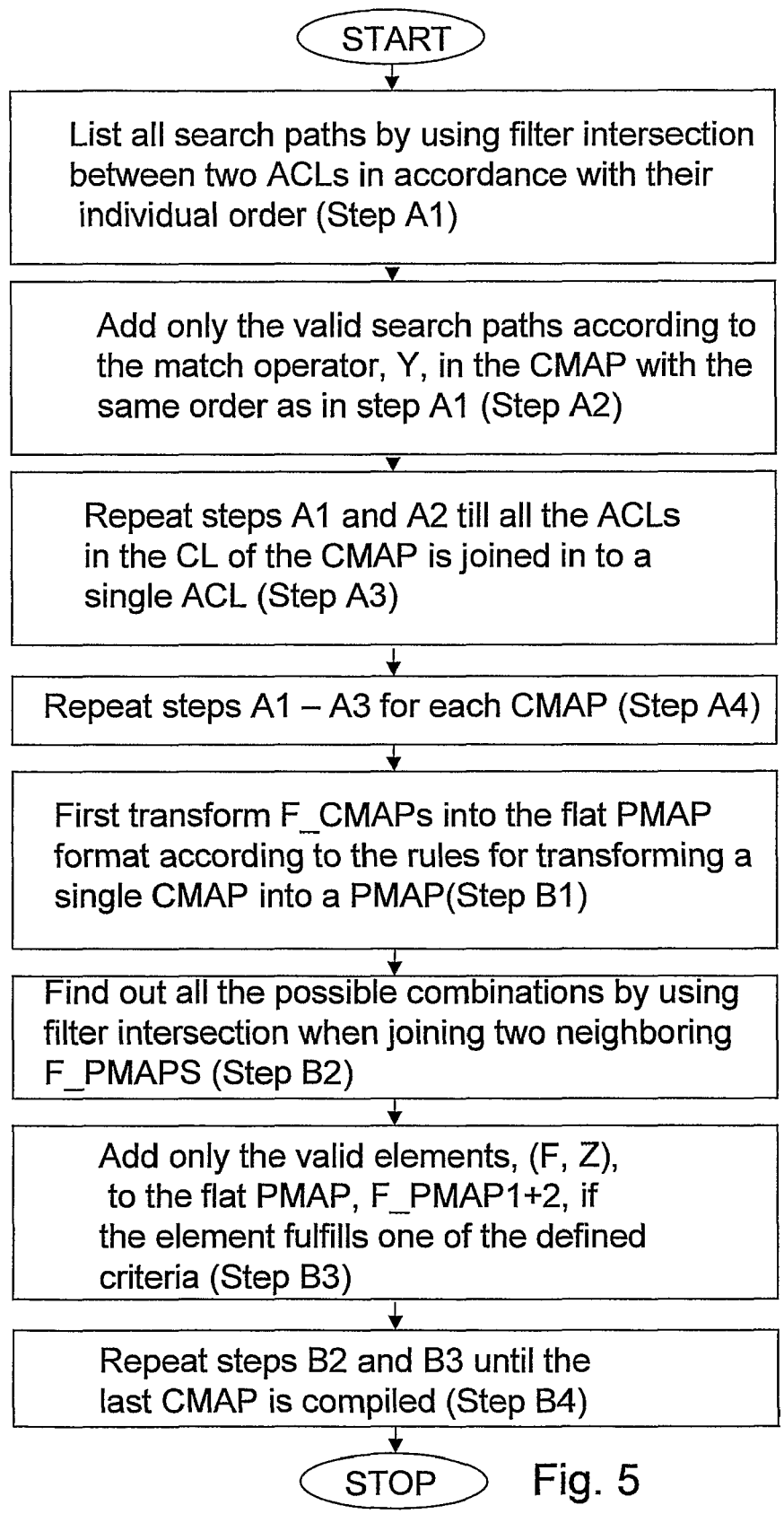
FIG. 5 is a flow-chart illustrating a first embodiment of the present invented method.

As the classifiers have been defined in accordance to the theory of sets, the invented algorithm for transforming tree-like organized classifiers to flat filter structure, a kind of list structure, will now be present with reference to FIG. 5.

One important mathematical operation used hereafter is the intersection between two sets, i.e. the intersections between two filters. The filter intersection has been earlier defined as the intersection between two filters:

$$F_1 \cap F_2 = (f_{F1,1}, f_{F1,2}, \ldots, f_{F1,n}) \cap (f_{F2,1}, f_{F2,2}, \ldots, f_{F2,n})$$
$$= (f_{F1,1} \cap f_{F2,1}, f_{F1,2} \cap f_{F2,2}, \ldots, f_{F1,n} \cap f_{F2,n})$$
$$= \left( \sum_{i=1}^{n} <f_{F1,i} \cap f_{F2,i}> \right)$$

where $f_{F1,i} \cap f_{F2,i}$ is defined in Table 1.

The first section, sub-algorithm A or section A, of the present invention is the transformation of a CMAP into flat filter structure, hereafter denoted as F_CMAP.

A Class Map (CMAP) is defined as:

$$CMAP = (CL, Y)$$
$$= ((ACL_1, ACL_2, \ldots, ACL_n), Y)$$
$$= \left( \left( \sum_{i=1}^{n} <ACL_i> \right), Y \right)$$

When a packet matches a CMAP, the result is a match outcome $X \in \{\text{permit, deny}\}$. So there exists an equivalent ordered sequence of $(F_i, X_i)$ which defines the exact same classification rules as in the CMAP.

$$F\_CMAP = ((F_1, X_1), (F_2, X_2), \ldots, (F_N, X_N))$$
$$= \left( \sum_{i=1}^{n} <(F_i, X_i)> \right)$$

The last element in the ordered sequence is $(F_*, X_-)$. As in all the ACLs the last element is implicitly $(F_*, X_-)$.

It can be seen that the resulting flat CMAP, F_CMAP, has the same structure as in an ACL. To transform a CMAP to an F_CMAP, two neighboring ACLs in the CL of the CMAP can be joined into one equivalent ACL, and eventually all the ACLs will be transformed into a single equivalent ACL as the CL.

Two ACLs are as follows:

$$ACL_1 = ((F_{1,1}, X_{1,1}), (F_{1,2}, X_{1,2}), \ldots, (F_{1,m}, X_{1,m}))$$
$$= \left( \sum_{i=1}^{m} <(F_{1,i}, X_{1,i})> \right)$$

and $$ACL_2 = ((F_{2,1}, X_{2,1}), (F_{2,2}, X_{2,2}), \ldots, (F_{2,n}, X_{2,n}))$$
$$= \left( \sum_{j=1}^{n} <(F_{2,j}, X_{2,j})> \right)$$

To emphasize the implicit terminating element $(F_*, X_-)$ in every ACL, we rewrite the ACLs:

$$ACL_1 = ((F_{1,1}, X_{1,1}), (F_{1,2}, X_{1,2}), \ldots, (F_{1,m}, X_{1,m}), (F_*, X_{1,-}))$$
$$= \left( \sum_{i=1}^{m} <(F_{1,i}, X_{1,i})>, (F_*, X_{1,-}) \right)$$

and $$ACL_2 = ((F_{2,1}, X_{2,1}), (F_{2,2}, X_{2,2}), \ldots, (F_{2,n}, X_{2,n}), (F_*, X_{2,-}))$$
$$= \left( \sum_{i=1}^{n} <(F_{2,j}, X_{2,j})>, (F_*, X_{2,-}) \right)$$

We rewrite $ACL_1$ and $ACL_2$ in a more general form:

$$ACL_1 = \sum_{i=1}^{N_1} <(F_{1,i}, X_{1,i})>$$

and $$ACL_2 = \sum_{j=1}^{N_2} <(F_{2,j}, X_{2,j})>$$

where the last element in both ACLs is the implicit, if not otherwise already existing, universal filter with match outcome deny.

The algorithm for transforming them into a single one is as follows:
1) Step A1: List all the possible search paths with the corresponding match outcome with the same order as in the two ACLs by using the intersection operator "$\cap$", i.e. in the earlier defined filter intersection operation.
   $(F_{1,1}, X_{1,1})$,
   $(F_{1,1}, \cap F_{2,1}, X_{2,1}), (F_{1,1}, \cap F_{2,2}, X_{2,2}), \ldots, (F_{1,1}, \cap F_{2,n}, X_{2,n})$, $(F_{1,1} \cap F_{2,*}, X_{2,-})$,
$(F_{1,2}, X_{1,2})$,
$(F_{1,2} \cap F_{2,1}, X_{2,1}), (F_{1,2} \cap F_{2,2}, X_{2,2}), \ldots, (F_{1,2} \cap F_{2,n}, X_{2,n})$,
$(F_{1,2} \cap F_{2,*}, X_{2,-})$,
$\ldots$,
$(F_{1,1}, X_{1,1})$,
$(F_{1,1} \cap F_{2,1}, X_{2,1}), (F_{1,1} \cap F_{2,2}, X_{2,2}), \ldots, (F_{1,1} \cap F_{2,n}, X_{2,n})$,
$(F_{1,1} \cap F_{2,*}, X_{2,-})$,
$(F_{1,*} \cap F_{2,1}, X_{2,1}), (F_{1,*} \cap F_{2,2}, X_{2,1}), \ldots, (F_{1,*} \cap F_{2,n}, X_{2,n})$,
$(F_{1,*} \cap F_{2,*}, X_{2,-})$ which can be expressed with the following:

$$\sum_{i=1}^{N_1} <(F_1, X_i) + \sum_{j=0}^{N_2} <(F_{1,i} \cap F_{2,j}, X_j)>>$$

2) Step A2: Add only the valid search paths according to the match operator, Y, in the CMAP with the same order as in step A1, (i.e. see 1)).
2a) For the search path involving only the first ACL, the path is valid only when any of the following criteria are fulfilled:
$Y = Y_{All}$ and $X_{1,i} = X_{-}$
$Y = Y_{Any}$ and $X_{1,i} = X_{+}$
2b) For the search path involving both ACLS, the path is valid only when any of the following criteria are fulfilled:
$Y = Y_{All}$ and $X_{1,i} = X_{+}$
$Y = Y_{Any}$ and $X_{1,i} = X_{-}$ As for any $F(F_i \neq F_\emptyset)$, $F \cap F_{2,*} = F$, so the last element in the F_CMAP is always $(F_*, X_-)$.

The joined ACL, $ACL_{1+2}$, is:

$$ACL_{1+2} = \left(\sum_{i=1}^{N_1} <(F_{1,i}, X_{1,i})|Y = Y_{All}, X_{l,i} = X_{-} \text{ or } Y = Y_{Any}, X_{l,i} = X_{+}) + \right.$$

$$\left. \sum_{j=1}^{N_2} <(F_j, X_j)|Y = Y_{All}, X_{l,i} = X_{+} \text{ or } Y = Y_{Any}, X_{l,i} = X_{-} >>\right)$$

$ACL_{1+2}$ can be joined with next ACL in the CL, $ACL_3$. Therefore:

3) Step A3: Repeat steps A1 and A2 till all the ACLs in the CL of the CMAP is joined in to a single ACL.

By repeating these steps, all the ACLs in the CL of the CMAP can be joined in to a single one.

$$F\_CMAP = ((F_1, X_1), F_2, X_2), \ldots, (F_N, X_N)$$

$$= \left(\sum_{i=1}^{N} <(F_i, X_i)>\right)$$

where the last element is the implicit universal deny filter, $(F_*, X_-)$.

4) Step A4: Repeat steps A1-A3 for each CMAP till all CMAPS are F_CMAPs.

The next section, section B or sub-algorithm B, of the invented method is to transform a PMAP into a flat filter structure, i.e. F_PMAP.

A Policy Map (PMAP) is defined as:

$$PMAP = ((CMAP_1, Z_1), (CMPAP_2, Z_2), \ldots, (CMAP_m, Z_m))$$

$$= \left(\sum_{i=1}^{m} <(CMAP_i, Z_i)>\right)$$

where the last element is the implicit terminating universal $CMAP_*$ with the default action $Z_{Def}$.

As a CMAP can be represented by an equivalent F_CMAP, $$F\_CMAP = ((F_1, X_1), (F_2, X_2), \ldots, (F_N, X_N)$$

$$= \left(\sum_{i=1}^{N} <(F_i, X_i)>\right)$$

where the last element is the universal deny filter, $(F_*, X_-)$, we can rewrite the PMAP after converting ACLs in all CMAPs into F_CMAPs as:

$PMAP = ((F\_CMAP_1, Z_1), (F\_CMAP_2, Z_2), \ldots, (F\_CMAP_n, Z_n), (CMAP_*, Z_{Def}))$ $= (((F_{1,1}X_{1,1}), (F_{1,2}, X_{1,2}), \ldots, (F_{1,N1}, X_{1,N1}), (F_*, X_-)), Z_1),$ $((F_{2,1}X_{2,1}), (F_{2,2}, X_{2,2}), \ldots, (F_{2,N2}, X_{1,N2}), (F_*, X_-)), Z_2),$ $\ldots$ $((F_{n,1}, X_{n,1}), (F_{n,2}, X_{n,2}), \ldots, (F_{n,Nn}, X_{n,Nn}), (F_*, X_-)), Z_n), (CMAP_*Z_{Def}))$ The flat PMAP structure can be defined as $$F\_PMAP = ((F_1, Z_1), (F_2, Z_2), \ldots, (F_M, Z_M)) = \sum_{i=1}^{M} <(F_i, Z_i)>$$

where the last element is the universal default filter, $(F_*, Z_{Def})$.

To transform a PMAP into F_PMAP format, first all the CMAPs are transformed into F_CMAPS. Then join two neighboring F_CMAPs in the PMAP and transform into the flat structure as defined by the F_PMAP, and continue this until the last F_CMAP in the PMAP is transformed.

Two F_CMAPs are as follows:

$F\_CMAP_1 = ((F_{1,1}, X_{1,1}), (F_{1,2}, X_{1,2}), \ldots, (F_{N1}, X_{N1}), (F_*, X_-))$ and $F\_CMAP_2 = ((F_{2,1}, X_{2,1}), (F_{2,2}, X_{2,2}), \ldots, (F_{2,N2}, X_{1,N2}), (F_*, X_-))$ both with the terminating universal filter, $F_*$, with match outcome $X_-$ (deny).

To join two neighboring elements in a PMAP, $(F\_CMAP_1, Z_1)$ and $(F\_CMAP_2, Z_2)$ into the format $$\left( \sum_{i=1}^{M} <(F_i, Z_i)> \right),$$

the following steps are used:

5) Step B1: First transform F_CMAPs into the flat PMAP format according to the rules for transforming a single CMAP into a PMAP.

$F\_PMAP_1 = ((F_{1,1}, Z_1), (F_{1,2}, Z_1), \ldots, (F_{1,N1}, Z_1), (F_*, Z_{Def}))$ and $F\_PMAP_2 = ((F_{2,1}, Z_2), (F_{2,2}, Z_2), \ldots, (F_{2,N2}, Z_2), (F_*, Z_{Def}))$ Join two neighboring F_PMAPs, starting with the first F_PMAP as one of the F_PMAPs in the first iteration and thereafter using the combined iterated F_PMAP in the following iterations, into a single F_PMAP in accordance to the following steps:

6) Step B2: Find out all the possible combinations by using filter intersection when joining two neighboring F_PMAPS.

$(F_{1,1}, Z_1),$
$(F_{1,1}, \cap F_{2,1}, Z_2), (F_{1,1}, \cap F_{2,2}, Z_2), \ldots, (F_{1,1}, \cap F_{2,N2}, Z_2),$
$(F_{1,1}, \cap F_{2,*}, Z_{Def}),$
$(F_{1,2}, Z_1),$
$(F_{1,2}, \cap F_{2,1}, Z_2), (F_{1,2}, \cap F_{2,2}, Z_2), \ldots, (F_{1,2}, \cap F_{2,N2}, Z_2),$
$(F_{1,2}, \cap F_{2,*}, Z_{Def}),$
$\ldots,$
$(F_{1,N1}, Z_1),$
$(F_{1,N1}, \cap F_{2,1}, Z_2), (F_{1,N1}, \cap F_{2,2}, Z_2), \ldots, (F_{1,N1}, \cap F_{2,N2}, Z_2),$
$(F_{1,N1}, \cap F_{2,*}, Z_{Def}),$
$(F_{1,*}, Z_{Def})$ which can be expressed with the following:

$$\sum_{i=1}^{N_1} <(F_{1,i}, Z_1) + \sum_{j=0}^{N_2} <(F_{1,i} \cap F_{2,j}, Z_2) >>$$

In this case the implicit universal default filter, $(F_*, Z_{Def})$, terminating both F_PMAPs, is included.

7) Step B3: Add only the valid elements, $(F_*, Z)$, to the flat PMAP, $F\_PMAP_{1+2}$, if the element fulfills one of the following criteria:

For filters involving only the first F_CMAP: $Z_{1,i} \neq Z_{Def}$, $i \in \{1, 2, \ldots, N_1\}$ For filters involving both F_CMAPs: $F_{1,i} \cap F_{2,j} \neq F_\emptyset$, $i \in \{1, 2, \ldots, N_1\}$ and $j \in \{1, 2, \ldots, N_2\}$ The last element in the F_PMAP is $(F_{1,*}, Z_{Def})$ as all F_CMAPs end with the element $(F_*, X_-)$.

We can express the combined F_PMAP with:

For filters involving only the first F_CMAP: $Z_{1,i} \neq Z_{Def}$, $i \in \{1, 2, \ldots, N_1\}$ For filters involving both F_CMAPs: $F_{1,i} \cap F_{2,j} \neq F_\emptyset$, $i \in \{1, 2, \ldots, N_1\}$ and $j \in \{1, 2, \ldots, N_2\}$ The combined two neighboring CMAPs can be expressed as:

$$F\_PMAP_{1+2} = \sum_{i=1}^{N_1} <(F_{1,i}, Z_1) \Big| Z_{1,j} \neq Z_{Def} + \sum_{j=1}^{N_2} <(F_{1,i} \cap F_{2,j}, Z_2) \Big| F_{1,i} \cap F_{2,j} \neq F_\emptyset >>$$

8) Step B4: Repeat steps B2 and B3 until the last CMAP is compiled.

By repeating steps B2 and B3 until the last CMAP is compiled, we get a flat PMAP as:

$$F\_PMAP = ((F_1, Z_1), (F_2, Z_2), \ldots, (F_M, Z_M))$$

$$= \sum_{i=1}^{M} <(F_i, Z_i)>$$

where the last one is the implicit universal default CMAP, $(CMAP_*, Z_{Def})$.

The above presented method is a first embodiment of the invention. A second embodiment of the invention is used when compiling a combination of a firewall ACL and a PMAP to flat filter structure.

A firewall ACL is defined as:
$ACL_{FW} = ((F_1, X_1), (F_2, X_2), \ldots, (F_n, X_n), (F_*, X_-))$
where the default action will be $X_-$ (deny) defined in the terminating universal filter $F_*$.

We have an existing PMAP:
$PMAP = ((CMAP_1, Z_1), (CMAP_2, Z_2), \ldots, (CMAP_n, Z_n), (CMAP_*, Z_{Def}))$ Firewall rules are usually used prior to the PMAP, so the combined firewall ACL with a PMAP can be represented by:
$PMAP_{+FW} = ((CMAP_{FW}, Z_{FW}), (CMAP_1, Z_1), (CMAP_2, Z_2), \ldots, (CMAP_n, Z_n))$ The $CMAP_{FW}$ is equivalent to the original firewall ACL and $Z_{FW}$ is the defined action when a packet matches a filter rule in the ACL, such as "Drop". The default action can be "Forward" when firewall ACL is used alone, and "Continue" when the packet needs to be filtered/classified further.

The algorithm for compiling a firewall ACL to an equivalent ($CMAP_{FW}$, $Z_{FW}$) is as follows:

1) Step A1': First invert the firewall ACL by inverting the match outcome in the firewall ACL.
$\sim ACL_{FW} = ((F_1, \sim X_1), (F_2, \sim X_2), \ldots, (F_N, \sim X_N), (F_*, \sim X_-))$ The inverting operator, $\sim$, is defined for the match outcome as follows:
$\sim X_- = X_+$
$\sim X_+ = X_-$ i.e. permit is inverted to deny, and deny is inverted to permit.

So the inverted firewall ACL can be rewritten as:

$$\sim ACL_{FW} = ((F_1, \sim X_1), (F_2, \sim X_2), \ldots, (F_N, \sim X_N), (F_*, X_+))$$
$$= \left( \sum_{i=1}^{N} <(F_i, \sim X_i)> \right)$$

where the last one is the universal permit filter, $(F_*, X_+)$.

2) Step A2': Set the equivalent firewall CMAP to $CMAP_{FW} = (\sim ACL_{FW}, Y_*)$ 3) Step A3': Set the combined firewall ACL and PMAP to
$PMAP_{+FW} = ((CMAP_{FW}, Z_{FW}), (CMAP_2, Z_2), (CMAP_3, Z_3), \ldots, (CMAP_n, Z_n), (CMAP_*, Z_{Def}))$ It can be compiled to a flat PMAP, $F\_PMAP_{+FW}$, using the described algorithm according to section B of the invented compiling algorithm.

$$F\_PMAP_{+FW} = \left( \sum_{i=1}^{M} <(F_i, Z_i)> \right)$$

where the last element is the universal default filter, $(F_*, Z_{Def})$.

Optimization.

The flat filter structure for a PMAP can be defined as:
$F\_PMAP = ((F_1, Z_1), (F_2, Z_2), \ldots, (F_N, Z_N), (F_*, Z_{Def}))$ Following rules to optimize the entries:

Optimization rule A: An element in an F_PMAP, $(F_i, Z_i)$, is redundant if $F_i \subseteq F_j$ where $i \in \{1, 2, \ldots, N\}$ and $j < i$ where $F_i \subseteq F_j$ is true if and only if $F_i \cap F_j = F_i$ using the rules defined in Table. 1.

A more general rule is:

Optimization rule B: An element in an F_PMAP, $(F_i, Z_i)$, is redundant if $F_i \subseteq (F_1 \cup F_2 \cup \ldots \cup F_{i-1})$ where $i \in \{2, \ldots, N\}$ Notice that optimization rules A and B apply to an ACL as well.

The methods presented here is general and can be applied to a single ACL, CMAP, PMAP or a combination of all these.

Further Possibilities.

So far, the action $Z_i$ associated with match of a $CMAP_i$, in a Policy Map (PMAP)

$$PMAP = ((CMAP_1, Z_1), \ldots, (CMAP_i, Z_i), \ldots, (CMAP_n, Z_n), (CMAP_*, Z_{Def}))$$
$$= \left( \sum_{i=1}^{n+1} <(F_i, Z_i)> \right)$$

has been a single action (e.g. Forward, Drop, Remark DSCP field). The filter rule look-up is finished as soon as a match is found in a CMAP, and the corresponding action will be taken.

However, there are occasions when it is suitable to process a packet in several steps, e.g. multiple actions being taken for one packet along the processing pipeline. One simple example is the combined firewall ACL and Policy Map, where in the firewall ACL, the action to be taken is Continue to PMAP if it is a match with permit and the action is Drop if there is a match with deny.

In a Policy Map, the first action may involve a control flag such as $Z_1$=Remark DSCP field and continue to the next CMAP. The second action $Z_2$ can be defined as Set MPLS tag and Transmit. If a packet matches both $CMAP_1$ and $CMAP_2$, two actions will be taken, first the DSCP field in the packet is remarked, then based on the new DSCP value, the packet is tagged with an MPLS value and transmitted. Hence, the static rule now becomes a dynamic one, as the packet header has been changed due to the first action taken. Two approaches can be used to solve the problem:

1) Multiple Compilation and Search Method

As the packet header is changed, it is not possible to use the same header information for doing a look-up of filter rules. Thus it is necessary to do multiple searches with separate CMAPs and the corresponding action is taken after each search using the most recent updated header information.

2) Single Compilation and Search Method

If the header information is changed in the packet due to a match in the first CMAP, it is possible to replace the filters in $CMAP_2$ with the relevant filters in $CMAP_1$. Take the example mentioned above, there are two filters, $F_{1,1}$ and $F_{1,2}$ in $CMAP_1$ that will cause the remarking in DSCP field in the packet to a certain DSCP value, which is defined in a filter $F_{2,1}$ in $CMAP_2$. Thus it is possible to replace $F_{2,1}$ with $F_{1,1}$ and $F_{1,2}$ in $CMAP_2$ in compiling to a single flat PMAP. It is easily understood that this can easily cause TCAM entry blow-ups and the algorithm is getting more complicated.

The multiple compilation and search method described in 1) will cause suffering in speed, as the search time is proportional to the number of multiple searches, compared to the single search method described in 2). However, the single search method can easily cause blow-ups in number of entries. Thus there is a trade-off between speed and storage when comparing method 1) with 2). Generally, method 2) is more complicated to implement using a TCAM and can easily cause blow-up of entries.

The present invention also relates to a computer program product comprising a computer readable memory storage and stored computer readable software code involving program instructions capable of controlling a central processing unit of a computer or a microprocessor. When executed by the computer or microprocessor, the program instructions cause the computer or microprocessor to perform the steps of the method of the present invention.

Any computer readable memory storage of any kind that is available for sale on the market is possible to use for storing the computer readable software code comprising the invented algorithm.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method of compiling command-based policy rules to a flat filter list structure for storage in a Content Addressable Memory (CAM), said policy rules being organized in a tree-structure of classifiers, wherein a processor is configured to perform the steps of:
   (a) finding all the possible search paths in the tree structure;
   (b) adding to the flat filter list only the valid search paths according to defined criteria;
   (c) transforming a policy map (PMAP) into a flat policy map (F PMAP), wherein the PMAP is a sequence of pairs ($CMAP_i$, $Z_i$), where $Z_i$ is the action to be taken for a data packet (P) if it matches the Class map $CMAP_i$ with permit (deny), and each $CMAP_i$ is an ordered pair of a Class list (CL) and a corresponding match operator $Y_i$ that either is set to MATCH ALL ($Y_{all}$) or set to MATCH ANY ($Y_{any}$), and the F PMAP is a list of ordered pairs ($F_i$, $Z_i$), wherein the list of ordered pairs ($F_i$, $Z_i$) is the result of steps (a) and (b); wherein step (c) includes:
   transforming a Class map (CMAP) into a flat Class map (F_CMAP), wherein the CMAP comprises the Class list (CL), which comprises a sequence of Access Control Lists ($ACL_i$), wherein each $ACL_i$ is a sequence of ordered pairs ($F_i$, $X_i$), where $F_i$ is a filter and $X_i$, is a corresponding matching outcome, wherein $X_i$ is either PERMIT or DENY, and the F_CMAP is a second sequence of ordered pairs ($F_j$, $X_j$), wherein the second sequence of ordered pairs ($F_j$, $X_j$) is the result of the steps:
   (d) listing all search paths by a using a filter intersection between two ACLs in accordance with the individual order of the ACLs;
   (e) adding only the valid search paths according to the match operator, Y, in the CMAP with the same order as in step (d); and
   (f) repeating steps (d) and (e) until all the ACLs in the CL of the CMAP are joined in to a single ACL.

2. The method according to claim 1, wherein step (c) includes repeating steps (d)-(f) for each CMAP until all CMAPS are F-CMAPs.

3. The method according to claim 1, wherein step (e) includes determining valid search paths, said determining step including:
   for the search path involving only the first ACL, determining the path is valid only when any of the following criteria are fulfilled:
   $Y=Y_{All}$ and $X_{1,i}=X_-$; and
   $Y=Y_{Any}$ and $X_{1,i}=X_+$;
   for the search path involving both ACLs, determining the path is valid only when any of the following criteria are fulfilled:
   $Y=Y_{All}$ and $X_{1,i}=X_+$; and
   $Y=Y_{Any}$ and $X_{1,i}=X_-$.

4. The method according to claim 1, wherein step (c) includes the step of first transforming F_PMAPs into a flat PMAP format according to rules for transforming a single CMAP into a PMAP.

5. The method according to claim 4, wherein step (c) includes the steps of:
   (g) determining all possible combinations by using a filter intersection when joining two neighboring F_PMAPs;
   (h) adding only the valid elements (F, Z), to the flat PMAP (F_PMAP), if the element fulfills one of the following criteria:
   for filters involving only the first F_CMAP: $Z_{1,i} \neq Z_{Def}$, $i \in \{1, 2, \ldots, N_1\}$; and
   for filters involving both F_CMAPs: $F_{1,i} \cap F_{2,j} \neq F_\varnothing$, $i \in \{1, 2, N_1\}$; and $j \in \{1, 2, \ldots, N_2\}$; and
   (i) repeating steps (g) and (h) until the last CMAP is compiled.

6. The method according to claim 1, wherein the transformation of step (c) involves a combination of a firewall ACL and a PMAP to flat filter structure, and step (c) includes the steps of:
   inverting the firewall ACL by inverting the match outcome in the firewall ACL, resulting in $\sim ACL_{FW} = ((F_1, \sim X_1), (F_2, \sim X_2), \ldots, (F_{N1}, \sim X_N), (F_{*1}, \sim X_-))$;
   setting the equivalent firewall CMAP to $CMAP_{FW} = (\sim ACL_{FW}, Y^*)$; and
   setting the combined firewall ACL and PMAP to $PMAP_{+FW} = ((CMAP_{FW}, Z_{FW}), (CMAP_2, Z_2), (CMAP_3, Z_3), \ldots, (CMAP_N, Z_N), (CMAP, Z_{Def}))$.

7. The method according to claim 1, wherein the Content Addressed Memory (CAM) is a Ternary Content Addressed Memory (TCAM).

* * * * *

UNITED STATES PATENT AND TRADEMARK OFFICE
CERTIFICATE OF CORRECTION

PATENT NO. : 8,260,886 B2
APPLICATION NO. : 12/158791
DATED : September 4, 2012
INVENTOR(S) : Kling et al.

It is certified that error appears in the above-identified patent and that said Letters Patent is hereby corrected as shown below:

In Column 7, Line 59, delete "$F_\oslash$," and insert -- $F_\oslash$. --, therefor.

In Column 8, Line 2, delete "ACLS," and insert -- ACLs, --, therefor.

In Column 11, Line 24, delete "1))." and insert -- 1). --, therefor.

In Column 11, Line 29, delete "ACLS," and insert -- ACLs, --, therefor.

In Column 12, Line 13, delete "CMAPS" and insert -- CMAPs --, therefor.

In Column 12, Line 23, delete "$(CMPAP_2, Z_2)$," and insert -- $(CMAP_2, Z_2)$, --, therefor.

In Column 13, Line 20, delete "F_CAMPS." and insert -- F_CAMPs. --, therefor.

In Column 13, Line 64, delete "F_PMAPS." and insert -- F_PMAPs. --, therefor.

In Column 14, Line 30, delete "$(F_*,Z)$," and insert -- $(F,Z)$, --, therefor.

In Column 15, Line 16, delete "$(CMAP_n,Z_n)$" and insert -- $(CMAP_n,Z_n))$ --, therefor.

In Column 17, Line 33, in Claim 1, delete "(F PMAP)," and insert -- (F_PMAP), --, therefor.

In Column 17, Line 39, in Claim 1, delete "F PMAP" and insert -- F_PMAP --, therefor.

In Column 17, Line 45, in Claim 1, delete "$X_i$," and insert -- $X_i$ --, therefor.

In Column 17, Line 52, in Claim 1, delete "by a using" and insert -- by using --, therefor.

In Column 18, Line 8, in Claim 2, delete "CMAPS" and insert -- CMAPs --, therefor.

Signed and Sealed this
Nineteenth Day of February, 2013

Teresa Stanek Rea
*Acting Director of the United States Patent and Trademark Office*

CERTIFICATE OF CORRECTION (continued)
U.S. Pat. No. 8,260,886 B2

In Column 18, Lines 34-35, in Claim 5, delete "$F_{2,j} \neq F_\emptyset$, i $\varepsilon$ {1, 2, $N_1$});" and insert -- $F_{2,j} \neq F_\emptyset$, i $\varepsilon$ {1, 2, ...., $N_1$}); --, therefor.

In Column 18, Line 46, in Claim 6, delete "($\sim ACL_{FW}$, Y*); and" and insert -- ($\sim ACL_{FW}$, Y*); and --, therefor.

In Column 18, Line 49, in Claim 6, delete "(CMAP, $Z_{Def}$))." and insert -- (CMAP*, $Z_{Def}$)). --, therefor.